United States Patent
Hui et al.

(10) Patent No.: US 8,000,420 B2
(45) Date of Patent: Aug. 16, 2011

(54) SYSTEM AND METHOD OF JOINT SYNCHRONIZATION AND NOISE COVARIANCE ESTIMATION

(75) Inventors: Dennis Hui, Cary, NC (US); Abdulrauf Hafeez, Cary, NC (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 906 days.

(21) Appl. No.: 11/993,507

(22) PCT Filed: Jun. 24, 2005

(86) PCT No.: PCT/IB2005/002149
§ 371 (c)(1),
(2), (4) Date: Dec. 21, 2007

(87) PCT Pub. No.: WO2006/136875
PCT Pub. Date: Dec. 28, 2006

(65) Prior Publication Data
US 2010/0136940 A1 Jun. 3, 2010

(51) Int. Cl.
*H03D 1/06* (2006.01)
*H04B 1/10* (2006.01)

(52) U.S. Cl. ....... 375/348; 375/350; 375/355; 455/63.1; 455/67.13; 455/296; 455/307

(58) Field of Classification Search .................. 375/267, 375/347, 348, 349, 350, 355, 356; 455/63.1, 455/67.13, 296, 307
See application file for complete search history.

(56) References Cited

U.S. PATENT DOCUMENTS

| | | | | |
|---|---|---|---|---|
| 6,064,689 A | * | 5/2000 | Vollmer et al. | 375/348 |
| 6,847,690 B1 | * | 1/2005 | Sahlin et al. | 375/354 |
| 6,961,371 B2 | * | 11/2005 | Wang et al. | 375/354 |
| 7,373,130 B2 | * | 5/2008 | Huss | 455/296 |
| 7,388,935 B2 | * | 6/2008 | Hui | 375/348 |
| 7,912,162 B2 | * | 3/2011 | Mueller-Weinfurtner | 375/354 |

OTHER PUBLICATIONS

David Astely, Adnreas Jakobsson, A. Lee Swindlehurst, Burst Synchronization on Unknown Frequency Selective Channels with Co-Channel Interference Using an Antenna Array, Vehicular Technology Conference, May 16-20, 1999. Online vol. 3, May 16, 1999, pp. 2363-2367.

* cited by examiner

*Primary Examiner* — Quochien B Vuong
(74) *Attorney, Agent, or Firm* — Roger S. Burleigh

(57) ABSTRACT

A system and method in a radio receiver for joint synchronization and noise covariance estimation of a received signal. A spatially and temporally stacked signal model, whereby successive samples of temporally adjacent received signal vectors and corresponding training vectors are stacked, is used in the derivation of the estimation problem. The Toeplitz structure of the channel response matrix is neglected in the formulation of the estimation problem. The resulting estimator jointly estimates a synchronization position, a channel response matrix, and a noise covariance matrix. An estimate of a whitened channel is then computed based on the noise covariance matrix and the estimate of the channel response matrix.

12 Claims, 3 Drawing Sheets

SYSTEM AND METHOD OF JOINT SYNCHRONIZATION AND NOISE COVARIANCE ESTIMATION

FIELD OF THE INVENTION

The present invention relates to radio telecommunication systems. More particularly, and not by way of limitation, the present invention is directed to a system and method in a radio receiver of joint synchronization and noise covariance estimation based on a spatially and temporally stacked signal model.

BACKGROUND OF THE INVENTION

The increasing popularity of mobile communications has placed a tremendous demand on the scarce radio resources of cellular communication networks. To efficiently utilize these valuable resources, radio frequencies in Time Division Multiple Access (TDMA) cellular systems such as GSM/EDGE, are being reused with closer proximity than ever. As a result, mutual interference among users occupying the same radio channel has become a major source of signal disturbance. The ability to suppress co-channel interference has become increasingly important for mobile receivers in cellular systems with tight reuse.

Multi-branch diversity or array processing is a class of commonly used techniques for suppressing interference, in which multiple versions of the same transmitted signal are produced and processed jointly in the receiver in order to cancel one or more interfering signal(s). The different signal versions may be obtained by using multiple receiving antennas, by sampling the received signal over the baud rate of transmission (i.e., oversampling), by separating in-phase (I) and quadrature-phase (Q) of the signal, or by combinations of these. The method of separating in-phase (I) and quadrature-phase (Q) of the signal is commonly referred to as the single-antenna-interference cancellation (SAIC) method and has recently received much attention in GERAN standardization.

In conventional array processing, the interference is typically modeled as temporally (across time) and/or spatially (across different signal versions) colored noise. By performing proper spatial and/or temporal noise whitening, the interference can be suppressed substantially. Such whitening operation may be performed before or during demodulation/equalization.

In order to suppress the noise or interference through spatial-temporal whitening, the receiver typically requires an estimate of a certain spectral property of the noise, such as the noise covariance matrix. From such spectral property, a whitening filter can then be derived to whiten, and therefore suppress, the noise. If the statistics of interference can be assumed to be approximately stationary over the data burst, which is the case in a nearly-synchronized network, the estimation of the noise spectral property may be performed over a sequence of training symbols in each data burst that is known to the receiver.

In addition, the demodulator or equalizer of the receiver must also be able to synchronize to the beginning of a data burst in order to begin demodulation. The synchronization process is typically done jointly with channel estimation over the training sequence. When spatial/temporal whitening is performed on the received signal to suppress noise or interference, the operating carrier-to-interference power ratio (C/I) can be changed so drastically that the ordinary method of synchronization and channel estimation, such as the least-squares (LS) method, can no longer produce an accurate synchronization position. As a result, the reliability of synchronization and channel estimation becomes a bottleneck of the overall receiver performance.

One known way of improving synchronization and quality of channel estimation in a multi-branch receiver is to first perform a certain initial synchronization and channel estimation, such as the LS channel estimation, and then estimate the noise covariance matrix or function based on the residual signal after channel estimation. From the estimated noise covariance matrix, a whitening filter can be computed using the well-known Whittle-Wiggins-Robinson Algorithm (WWRA) (or sometimes referred to as the generalized Levinson-Durbin algorithm). The problem with this approach is that the initial synchronization and channel estimation (before whitening) may not produce an accurate estimate of the synchronization position and the channel estimate. As a result, the statistics of the residual signal obtained from initial synchronization and channel estimation may not be representative of the statistics of the actual noise or interference.

Alternatively, the synchronization position and the coefficients of the whitening filter may be jointly estimated using the known indirect generalized least-squares (iGLS) algorithm. A by-product of this joint estimation is an estimate of the whitened channel response. However, the conventional iGLS algorithm does not allow efficient sharing of intermediate results produced at adjacent hypothesized synchronization positions. If the iGLS algorithm is brute-force applied at all synchronization positions, the computational requirements are greatly increased. In addition, the performance of the iGLS algorithm suffers when there are multiple interferers.

SUMMARY OF THE INVENTION

In one aspect, the present invention is directed to a method in a radio receiver of joint synchronization and noise covariance estimation of a received signal. The method includes generating a spatially and temporally stacked signal model by stacking successive samples of temporally adjacent received signal vectors and corresponding training vectors. A best synchronization position is determined for the received signal based on the stacked signal and training vectors, and a best estimate of a noise covariance matrix is computed based on the synchronization position and the stacked signal and training vectors. The method also includes computing a channel estimate through the steps of creating a fictitious channel that neglects the Toeplitz structure of a received channel matrix, and computing an estimate of the fictitious channel based on the synchronization position and the stacked signal and training vectors. The method then computes an estimate of a whitened channel based on the noise covariance matrix and the estimate of the fictitious channel.

In another aspect, the present invention is directed to a method in a radio receiver of joint synchronization and noise covariance estimation of a received signal. The method includes generating a spatially and temporally stacked signal model by stacking successive samples of temporally adjacent received signal vectors and corresponding training vectors; and replacing a received Toeplitz channel matrix with a fictitious channel matrix that neglects the Toeplitz structure of the received channel matrix. The method then determines a maximum likelihood joint estimate of the fictitious channel, a noise covariance matrix, and a synchronization position, wherein the maximum likelihood joint estimate is found by maximizing a log likelihood function over all possible channel estimates of the fictitious channel, over all possible noise covariance matrices, and over all possible synchronization positions utilizing the spatially and temporally stacked signal model.

In yet another aspect, the present invention is directed to a system in a radio receiver for jointly synchronizing a received signal and estimating a noise covariance matrix. The system includes a synchronization and estimation unit, a data burst capture unit, a whitening filter, and an equalizer with an optional prefilter. The synchronization and estimation unit includes means for generating a spatially and temporally stacked signal model by stacking successive samples of temporally adjacent received signal vectors and corresponding training vectors; means for determining a best synchronization position for the received signal based on the stacked signal and training vectors; means for computing a best estimate of a noise covariance matrix based on the synchronization position and the stacked signal and training vectors; means for creating a fictitious channel that neglects the Toeplitz structure of a received channel matrix; means for computing an estimate of the fictitious channel based on the synchronization position and the stacked signal and training vectors; and means for computing an estimate of a whitened channel based on the noise covariance matrix and the estimate of the fictitious channel. The data burst capture unit receives the synchronization position from the synchronization and estimation unit and defines the received data burst based on the synchronization position. The whitening filter receives the defined data burst from the data burst capture unit, receives the whiteneing filter parameters from the synchronization and estimation unit, and generates a whitened data burst by filtering the defined data burst using the whitening filter parameters. The equalizer receives the whitened data burst from the whitening filter, computes coefficients of an optional prefilter using the whitened channel estimate generated by the synchronization and estimation unit, filters the whitened data burst using the prefilter coefficients, and equalizes bits in the prefiltered data burst for further processing.

DESCRIPTION OF THE INVENTION

Figure 1:
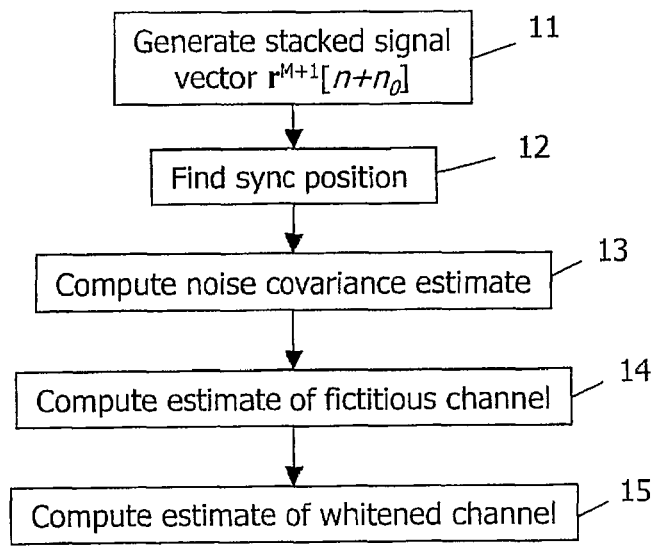
FIG. 1 is a flow diagram of the steps of an embodiment of the method of the present invention.

The present invention utilizes a joint estimation method based on a spatial and temporally stacked signal model. Unlike the conventional iGLS algorithm, however, the present invention allows efficient sharing of intermediate results produced at adjacent hypothesized synchronization positions and therefore has lower computational requirements than the brute-force application of the iGLS algorithm at all synchronization positions. Moreover, as shown below, the present invention provides significantly better performance than the conventional iGLS method when there are multiple interferers. Note that the whitening filter coefficients computed using either the WWRA or the iGLS algorithm are always square matrices. However, the whitening filter coefficients produced by the present invention may be non-square matrices. Therefore, whitening filters computed utilizing the present invention are fundamentally different from those computed by traditional algorithms.

Consider the following typical, dispersive multiple-input-multiple-output (MIMO) signal model with additive noise:

$$r[n+n_0] = \sum_{k=0}^{L-1} C[k]s[n-k] + v[n] \quad (1)$$

for n=L−1, L, ..., N−1, where N denotes the length of the training sequence (N=26 for GSM/EDGE), r[n] denotes a $N_r$-dimensional received (column) vector (for example, formed by stacking in-phase (I) and quadrature-phase (Q) components of a received signal, oversampling of the received signal, utilizing multiple antennas, or combinations of these), $n_0$ denotes the synchronization position, which is the time index of the first symbol of the training period, {C[k]} denotes a $N_r$ by $N_t$ MIMO channel response, {s[n]} denotes possibly $N_t$-dimensional training vector (for example, formed by stacking I and Q components of training symbols, training symbols of multiple users, etc.), and {v[n]} denotes a spatially and temporally colored noise process used to model the interference. Also, let Π denote a (finite) set of possible synchronization positions.

The following description utilizes a stacked vector notation. Let $r^{M+1}[n] \equiv \text{vec}([r[n], r[n-1], \ldots r[n-M]]) = [r[n]^T, r[n-1]^T, \ldots r[n-M]^T]^T$ be a vector formed by stacking $\{r[k]\}_{k=n-M}^{n}$ in a column, where M denotes the "model order", and for any matrix A, vec(A) is the vector formed by stacking columns of A one by one into a single column vector, i.e. using matlab notation, vec(A)≡A(:).

Similarly, let $v^{M+1}[n] \equiv \text{vec}([v[n], v[n-1,], \ldots v[n-M]])$ denote the corresponding stacked noise vector, and let $s^L[n] \equiv \text{vec}([s[n], s[n-1,], \ldots, s[n-L+1]])$ denote the corresponding stacked training vector. Rewriting the signal model in equation (1) by stacking (M+1) temporally adjacent received vectors, results in the following stacked signal model:

$$r^{M+1}[n+n_0] = T(C)s^{L+M}[n] + v^{M=1}[n], \quad (2)$$

where $$T(C) \equiv \begin{bmatrix} C[0] & C[1] & \ldots & C[L-1] & 0 & \ldots & 0 \\ 0 & C[0] & C[1] & \ldots & C[L-1] & 0 & \vdots \\ \vdots & \vdots & \vdots & \vdots & \vdots & \vdots & \vdots \\ \vdots & 0 & C[0] & C[1] & \ldots & C[L-1] & 0 \\ 0 & \ldots & 0 & C[0] & C[1] & \ldots & C[L-1] \end{bmatrix} \quad (3)$$

is an (M+1)×(L+M) block Toeplitz matrix of block size $N_r \times N_t$. A key model assumption is that the (expanded) noise vector process $\{v^{M+1}[n]\}$ is IID, and let $\Lambda \equiv E[v^{M+1}[n](v^{M+1}[n])^H]$ be the covariance matrix of $v^{M+1}[n]$. Then, ideally, the invention finds the maximum-likelihood joint estimate of (C, Λ, $n_0$) as given by:

$$(\hat{C}_{ML}, \hat{\Lambda}_{ML}, \hat{n}_0^{ML}) =$$

$$\underset{(C,\Lambda,n_0)}{\mathrm{argmax}} p(\{r^{M+1}[n+n_0]\}_{n=L+M-1}^{N-1} \mid C, \Lambda, n_0) = \underset{(C,\Lambda,n_0)}{\mathrm{argmax}} LL(C, \Lambda, n_0)$$

where $LL(C,\Lambda,n_0)$ is the log likelihood function given by:

$$LL(C, \Lambda, n_0) \equiv \log p(\{r^{M+1}[n+n_0]\}_{n=L+M-1}^{N-1} \mid C, \Lambda, n_0) = \quad (4)$$

$$-(N-L-M+1)\log\det\Lambda - \sum_{n=L+M-1}^{N-1} (r^{M+1}[n+n_0] - T(C)s^{L+M}[n])^H$$

$$\Lambda^{-1}(r^{M+1}[n+n_0] - T(C)s^{L+M}[n]).$$

This is the objective function to be maximized over all possible channel estimates, C, and over all noise covariance matrices, $\Lambda$, and over all synchronization positions, $n_0$. From the noise covariance matrix, the whitening filter can then be derived.

Unfortunately, there is no close-form expression for this joint estimate. In this disclosure, a so-called "indirect" approach is taken by modifying the log likelihood function as:

$$LL'(H, \Lambda, n_0) = \quad (5)$$

$$-(N-L-M+1)\log\det\Lambda - \sum_{n=L+M-1}^{N-1} (r^{M+1}[n+n_0] - Hs^{L+M}[n])^H$$

$$\Lambda^{-1}(r^{M+1}[n+n_0] - Hs^{L+M}[n]).$$

where $H \equiv T(C)$ is a fictitious channel, which originates from the stacking formulation in equation (2). The present invention provides a method for computing the joint estimate of the synchronization position $n_0 \in \Pi$, the fictitious channel H, and the noise covariance matrix $\Lambda$ that maximizes the modified log likelihood function in equation (5). In other words, this indirect approach neglects the Toeplitz structure of the T(C) in order to obtain close-form expressions for the estimates of $\Lambda$ and $n_0$. Based on the resulting estimate of noise covariance matrix $\Lambda$, a whitening filter F can be obtained (for example, using the Cholesky decomposition) such that $F^H F = \Lambda^{-1}$. Instead of producing an estimate of the original channel C, the present invention produces an estimate of the fictitious channel H, which may then be used to generate the estimate $\hat{H}_F \equiv FH$ of the whitened channel $\hat{H}_F = FT(C)$.

In the present invention, equation (5) is utilized as an approximation of equation (4). The T(C) function in equation (4) is replaced by the variable H, a fictitious channel. The Toeplitz structure of the T(C) function is ignored, and then instead of maximizing over C, the invention maximizes over H. Thus, equation (5) is maximized over all possible H, $\Lambda$, and $n_0$.

FIG. 1 is a flow diagram of the steps of the preferred embodiment of the method of the present invention. At step 11, a stacked signal model is generated. The dispersive MIMO signal model with additive noise, $r[n+n_0]$ as shown in equation (1) is rewritten by stacking M+1 temporally adjacent received vectors to obtain the stacked model, $r^{M+1}[n+n_0]$, as shown in equation (2). At step 12, the best synchronization position $\hat{n}_0$ is found by performing conventional least-squares synchronization on the stacked signal vector $r_{n+n_0-M}^{n+n_0}$ based on the stacked training vector $s_{n-L-M+1}^{n}$ according to the equation:

$$\hat{n}_0 = \underset{n_0 \in \Pi}{\mathrm{argmin}} \det \hat{\Lambda}(n_0) \quad (6)$$

where $$\hat{\Lambda}(n_0) = \sum_{n=L+M-1}^{N-1} r^{M+1}[n+n_0](r^{M+1}[n+n_0])^H - \quad (7)$$

$$\left[\sum_{n=L+M-1}^{N-1} r^{M+1}[n+n_0](s^{L+M}[n])^H\right]\left[\sum_{n=L+M-1}^{N-1} s^{L+M}[n](s^{L+M}[n])^H\right]^{-1}\left[\sum_{n=L+M-1}^{N-1} s^{L+M}[n](r^{M+1}[n+n_0])^H\right].$$

At step 13, the best estimate $\hat{\Lambda}$ of the noise covariance matrix is computed according to $\hat{\Lambda} = \hat{\Lambda}(\hat{n}_0)$. At step 14, the best estimate $\hat{H}$ of the fictitious channel is computed according to the equation:

$$\hat{H} = \quad (8)$$

$$\left[\sum_{n=L+M-1}^{N-1} r^{M+1}[n+\hat{n}_0](s^{L+M}[n])^H\right]\left[\sum_{n=L+M-1}^{N-1} s^{L+M}[n](s^{L+M}[n])^H\right]^{-1}$$

Finally, at step 15, an estimate $\hat{H}_F$ of the whitened channel is computed according to $\hat{H}_F = \hat{F}\hat{H}$, where $\hat{F}$ denotes any "square root" of the matrix $\hat{\Lambda}^{-1}$ such that $\hat{F}^H \hat{F} = \hat{\Lambda}^{-1}$, which can be obtained by Cholesky decomposition or Eigen-decomposition.

Note that the ordering of steps 13 and 14 above is not relevant, i.e., these steps may be performed in reverse order because neither of these steps depends on the result of the other. Also note that the inverse of the middle bracket in equation (7) depends only on the training sequence, s, and therefore can be pre-computed beforehand. In addition, the computation of the quantities in the first and third brackets of equation (7) can be performed efficiently by sharing intermediate results among adjacent hypothesized synchronization positions in $\Pi$. The first and third brackets are related in that if one were to transpose the matrix in the first bracket and conjugate, the result would be the third bracket. If the first bracket is computed for different synchronization positions $n_0$ it is possible to share the intermediate results for different synchronization positions for the same bracket. There is a correlation over the samples received for the training period. While performing synchronization for the training period, a window is moving, but most of the samples are retained. Thus, that part of the correlation can be reused in computations for other synchronization positions.

Figure 2:
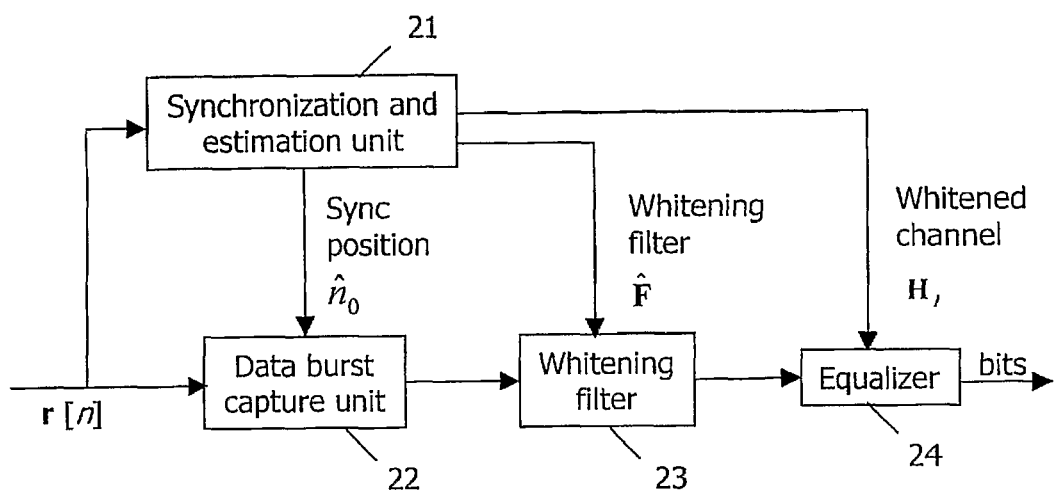
FIG. 2 is a simplified functional block diagram of an embodiment of the system of the present invention.

FIG. 2 is a simplified functional block diagram of an embodiment of the system of the present invention. In FIG. 2, a synchronization and estimation unit 21, functioning in accordance with the teachings of the present invention, is implemented in a radio receiver. A received signal r[n] is provided to the synchronization and estimation unit. The synchronization and estimation unit finds the synchronization position $\hat{n}_0$ and provides it to a data burst capture unit 22, thus enabling the demodulator or equalizer 24 of the receiver to synchronize to the beginning of the data burst. The synchronization and estimation unit also provides whitening filter parameters $\hat{F}$ for a whitening filter 23. An estimate of a certain spectral property of the noise, such as the noise covariance matrix $\hat{\Lambda}$, is utilized to derive the whitening filter 23 for whitening, and therefore suppressing, the noise. Finally, the synchronization and estimation unit provides an estimate $\hat{H}_F$ of the whitened channel to the equalizer 24.

In a preferred embodiment, the equalizer 24 may include a combining prefilter, such as that described in U.S. patent application Ser. No. 10/889,641 entitled, "An Efficient Method of Implementing Equalizers in Multiple-Antenna Wireless Receivers." The combining prefilter reduces implementation complexity by combining multiple signal branches coming from the whitening filter 23 into fewer branches. The prefilter coefficients are computed based on the whitened channel estimate $\hat{H}_F$ generated by the synchornization and estimation unit. The prefilter is followed by a reduced-complexity sequence detector, such as a Decision-Feedback Sequence Estimation (DFSE) detector, which may provide hard or soft estimates of the transmitted data bits. Alternatively, the prefilter may be implemented as a separate prefilter between the whitening filter 23 and the equalizer 24.

Justification:

In the following sections, a proof is provided to demonstrate that the joint estimate $(\hat{H}, \hat{n}_0, \hat{\Lambda})$, computed according to the teachings of the present invention, maximizes the modified log likelihood function in equation (5). In the following, the best estimate of H for a fixed $n_0$ and a fixed $\Lambda$ is first computed. This best estimate of H, denoted by $\hat{H}(n_0)$, does not depend on $\Lambda$. Substituting the expression of $\hat{H}(n_0)$ into equation (5), the best estimate $\hat{\Lambda}(n_0)$ of $\Lambda$ for a fixed $n_0$ is found by maximizing $LL'(\hat{H}(n_0), n_0, \Lambda)$ over all $\Lambda$. Finally, it can be shown that the modified log likelihood function in equation (5), evaluated at $H=\hat{H}(n_0)$ and $\Lambda=\hat{\Lambda}(n_0)$, is inversely proportional to the determinant of $\hat{\Lambda}(n_0)$ so that the best synchronization position $\hat{n}_0$ minimizes the determinant of $\hat{\Lambda}(n_0)$.

Best H for a Fixed $\Lambda$ and a Fixed $n_0$:

The log likelihood function in equation (5) can be written as:

$$LL'(H, \Lambda, n_0) = -(N-L-M+1)\log\det\Lambda - \tr\left\{\Lambda^{-1}\left[\sum_{n=L+M-1}^{N-1} (r^{M+1}[n+n_0] - Hs^{L+M}[n])(r^{M+1}[n+n_0] - Hs^{L+M}[n])^H\right]\right\} = $$
$$-(N-L-M+1)\log\det\Lambda - (N-L-M+1)\tr\{\Lambda^{-1}R_e(H)\}$$

where $$R_e(H) \equiv \frac{1}{N-L-M+1}\sum_{n=L+M-1}^{N-1} (r^{M+1}[n+n_0] - Hs^{L+M}[n])(r^{M+1}[n+n_0] - Hs^{L+M}[n])^H$$

The first term above does not depend on H and can therefore be neglected in the search of the best H. The second term is a monotonic function of $R_e(H)$ in the sense that if $Q_1$ and $Q_2$ are two non-negative definitive matrices such that $Q_1 \geq Q_2$ (i.e., $Q_1 - Q_2$ is non-negative definite), then $\tr\{\Lambda^{-1}Q_1\} \geq \tr\{\Lambda^{-1}Q_2\}$. Hence, the best H for fixed $\Lambda$ and $n_0$, denoted by $\hat{H}$, can be obtained using the orthogonal principle:

$$\sum_{n=L+M-1}^{N-1} (r^{M+1}[n+n_0] - \hat{H}s^{L+M}[n])(s^{L+M}[n])^H = 0 \quad (10)$$

which guarantees $R_e(H) \geq R_e(\hat{H})$ for any matrix H. Note that the solution of equation (10) depends on $n_0$ but not $\Lambda$. Hence the dependency on $n_0$ is attached with $\hat{H}$ to yield:

$$\hat{H}(n_0) = \left[\sum_{n=L+M-1}^{N-1} r^{M+1}[n+n_0](s^{L+M}[n])^H\right]\left[\sum_{n=L+M-1}^{N-1} s^{L+M}[n](s^{L+M}[n])^H\right]^{-1}, \quad (11)$$

which is the best H for a fixed $\Lambda$ and a fixed $n_0$.

Best $\Lambda$ for a fixed $n_0$:

Define $\log A \equiv \sum_{i=1}^{n_A}(\log \lambda_i)q_iq_i^H$ for any Hermitian symmetric positive definite matrix A, where $n_A$ denotes the dimension of A, $\{\lambda_i\}$, and $\{q_i\}$ are the eigenvalues and eigenvectors of A, respectively. Substituting equation (11) into equation (9) and using the identity $\log\det A = \tr(\log A)$, the log likelihood function can be rewritten as:

$$LL'(\hat{H}(n_0), \Lambda, n_0) = $$
$$(N-L-M+1)\tr(\log\Lambda^{-1} - \Lambda^{-1}R_e(\hat{H}(n_0)) = (N-L-M+1)$$
$$\tr(\log\Lambda^{-1}R_e(\hat{H}(n_0)) - \Lambda^{-1}R_e(\hat{H}(n_0)) - \log R_e(\hat{H}(n_0))) \leq$$
$$(N-L-M+1)\tr(-I_{(M+1)N_r} - \log R_e(\hat{H}(n_0)))$$

where the inequality above follows from the matrix identity $\log A \leq A - I$ for any Hermitian positive-definite matrix A. Note that the inequality becomes equality (in which case the log likelihood function is maximized) if, and only if, $\Lambda^{-1}R_e(\hat{H}(n_0)) = I_{(M+1)N_r}$, or equivalently $\Lambda = R_e(\hat{H}(n_0))$. By neglecting the normalization constant $(N-L-M+1)^{-1}$, it follows that the best $\hat{\Lambda}$ for a given $n_0$ is:

$$\hat{\Lambda}(n_0) = \sum_{n=L+M-1}^{N-1} (r^{M+1}[n+n_0] - \hat{H}(n_0)s^{L+M}[n]) \quad (12)$$
$$(r^{M+1}[n+n_0] - \hat{H}(n_0)s^{L+M}[n]),$$

which is the same as equation (7).

Best $n_0$:

Using equation (12) and equation (11), the best $n_0$ is given by:

$$\hat{n}_0 = \underset{n_0 \in \Pi}{\operatorname{argmax}} \max_{(H,\Lambda)} LL'(H, \Lambda, n_0)$$
$$= \underset{n_0 \in \Pi}{\operatorname{argmax}} LL(\hat{H}(n_0), \hat{\Lambda}(n_0), n_0)$$
$$= \underset{n_0 \in \Pi}{\operatorname{argmax}}\left[-(N-L-M+1)\log\det\hat{\Lambda}(n_0) - \tr\{I_{(M+1)N_r}\}\right]$$
$$= \underset{n_0 \in \Pi}{\operatorname{argmin}} \log\det\hat{\Lambda}(n_0)$$

which leads to equation (6).

Figure 3:
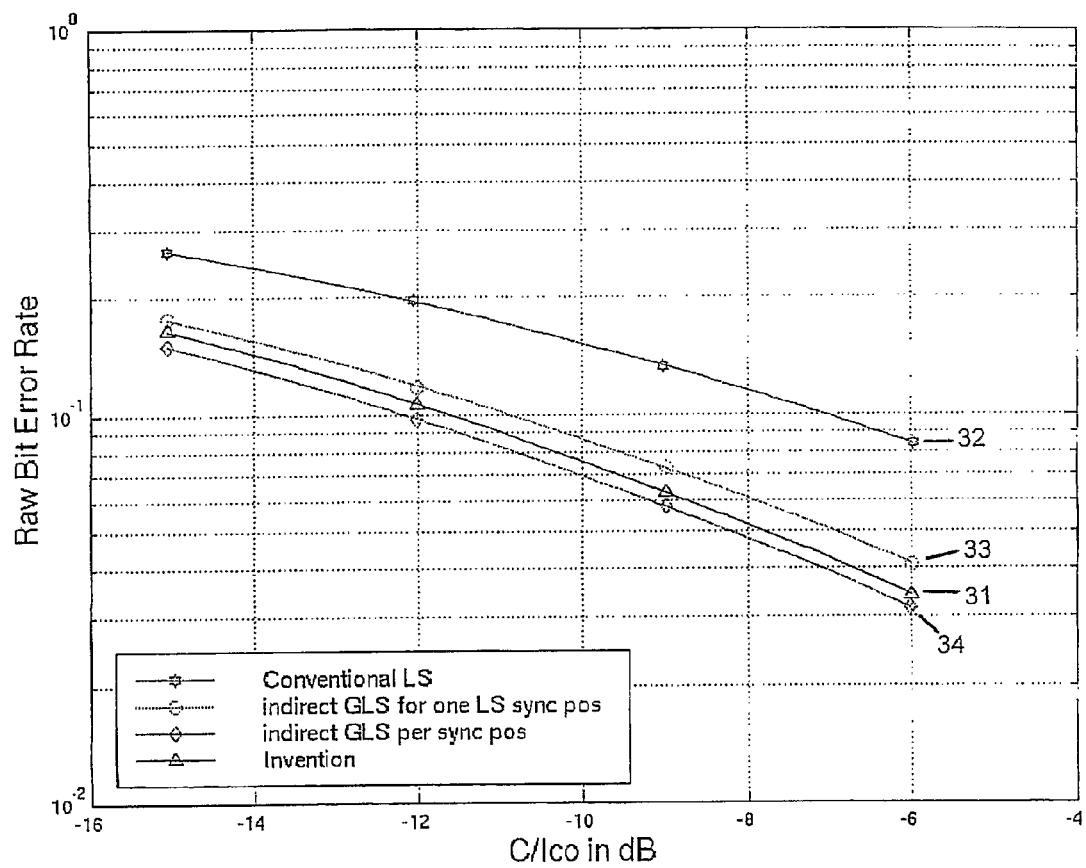
FIG. 3 is a performance graph of raw bit error rate as a function of carrier-to-co-channel interference (C/Ico) with a single co-channel interferer, comparing the invention with conventional estimation methodologies.

FIG. 3 is a performance graph of raw bit error rate as a function of carrier-to-co-channel interference (C/Ico) with a single co-channel interferer, comparing the invention with conventional methods of synchronization and channel estimation. The underlying cellular network is assumed to be approximately synchronized, and each interferer has a valid GSM training sequence in each burst.

Figure 4:
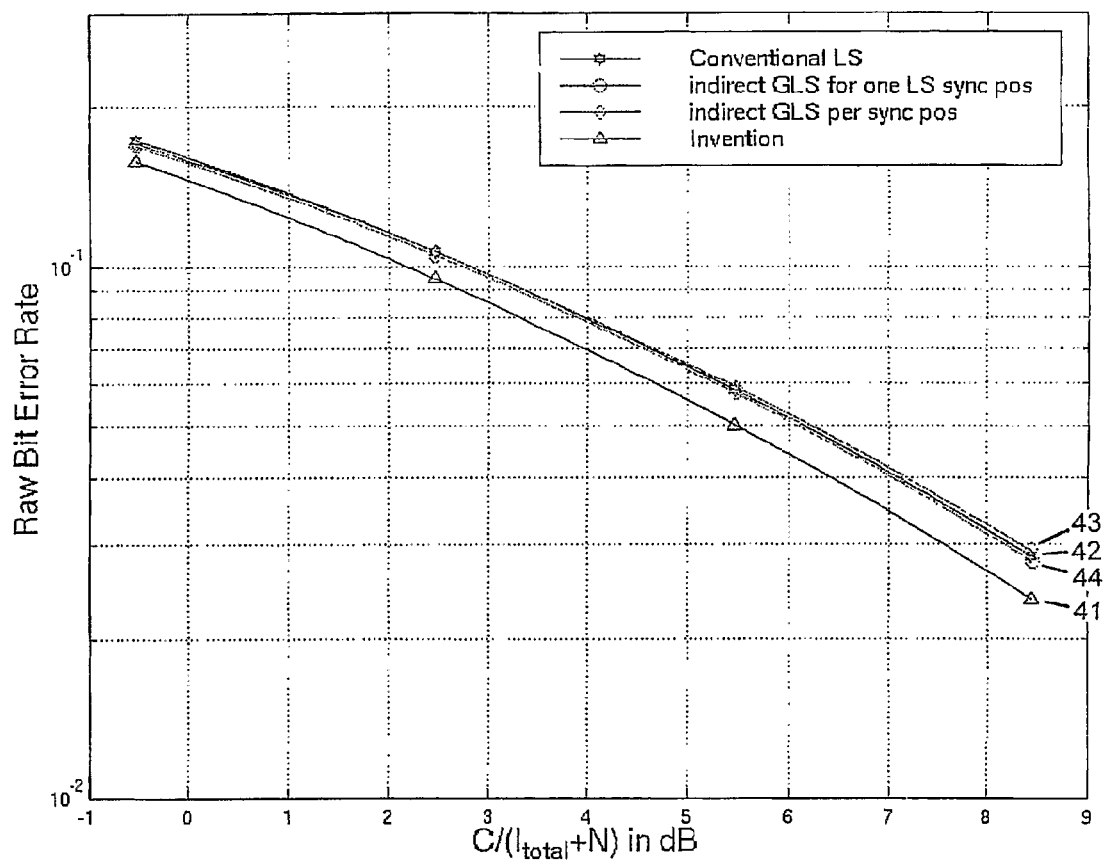
FIG. 4 is a graph of raw bit error rate as a function of carrier-to-total interference plus noise (C/I$_{total}$+N) with multiple co-channel interferers and additive white Gaussian noise, comparing the invention with conventional estimation methodologies.
Figure 1:
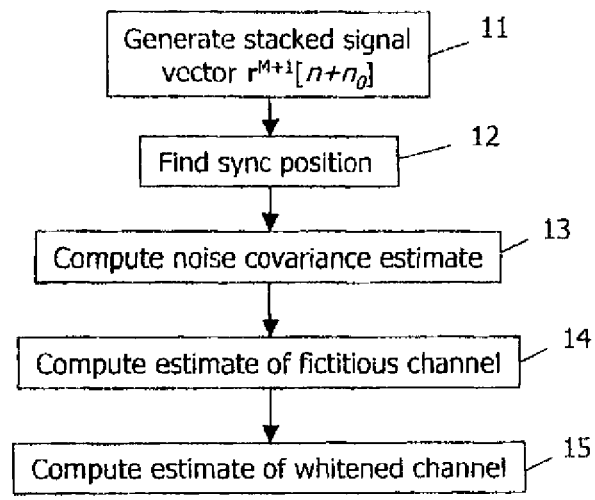
Figure 2:
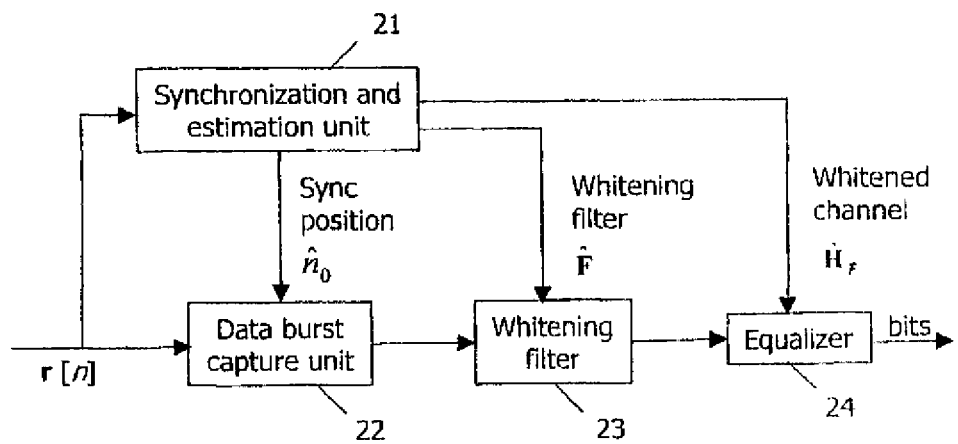

In both FIGS. 3 and 4, the receiver uses the odd and even phases of a two-time oversampled received signal, along with its I and Q components, to form a four-branch received signal (i.e., $N_r=4$ and $N_t=1$). In these figures, different synchronization and channel estimation schemes are compared with the same equalizer, which is a decision-feedback sequence estimation (DFSE) equalizer and is preceded by a multi-input-single-output (MISO) combining prefilter and a spatial-temporal whitening filter.

In FIG. 3, the performance of the invention 31 is compared with conventional methods of synchronization and channel estimation. As shown in the figure, a gain of about 4.5 dB can be attained using the invention compared to the conventional LS method of synchronization and channel estimation 32. Compared to the indirect GLS (iGLS) method with LS synchronization 33 (which was used in the old SAIC receiver for symbol-space sampled signals), the invention provides about a 0.7 dB gain. Compared to the case when the iGLS method is computed over every hypothesized synchronization position 34, the invention is outperformed by about 0.5 dB. However, this method of performing iGLS for every possible synchronization position is much more computationally expensive than the invention, since the matrix that needs to be inverted in the iGLS method is different for every synchronization position. In contrast, the invention only requires a single matrix inversion, and some of the required computation (for example, step 12 of the invention) can be shared over different synchronization positions.

FIG. 4 is a graph of raw bit error rate as a function of carrier-to-total interference plus noise ($C/I_{total}+N$) with multiple co-channel interferers and additive white Gaussian noise, comparing the invention with conventional methods of synchronization and channel estimation. The performance illustrated in FIG. 4 is based on a scenario in which there are two co-channel interferers with 10 dB difference in average power between them, an adjacent channel interferer whose power (before receiver filtering) is 3 dB higher than the stronger co-channel interferer, and some additive white Gaussian noise at $E_b/N_0=17$ dB. Again, the underlying cellular network is assumed to be approximately synchronized, and each interferer has a valid GSM training sequence in each burst.

In FIG. 4, the performance of the invention 41 is compared with conventional methods of synchronization and channel estimation in the case of multiple interferers. In this case, the conventional methods (i.e., the LS method of synchronization and channel estimation 42, the iGLS method with LS synchronization 43, and the case in which the iGLS method is computed over every hypothesized synchronization position 44) all provide about the level of same performance. The invention 41 provides a gain over these methods of about 0.7 dB, which is rather significant for multi-interferer scenarios.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

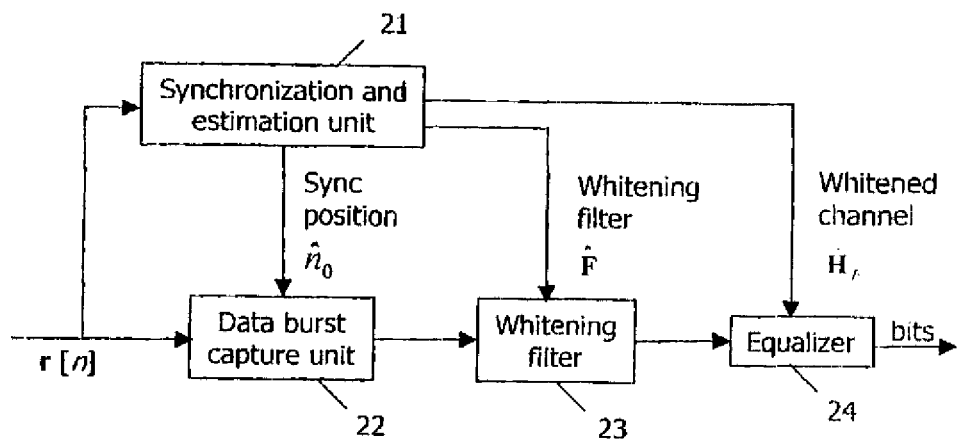

What is claimed is:

1. A method in a radio receiver of joint synchronization and noise covariance estimation of a received signal, said method comprising the steps of:
    generating a spatially and temporally stacked signal model by stacking successive samples of temporally adjacent received signal vectors and corresponding training vectors;
    determining a best synchronization position for the received signal based on the stacked training vectors;
    computing a best estimate of a noise covariance matrix based on the synchronization position and the stacked signal vectors;
    computing a channel estimate through the steps of:
        creating a fictitious channel that neglects the Toeplitz structure of a received channel matrix; and
        computing an estimate of the fictitious channel based on the synchronization position and the stacked signal and training vectors; and
    computing an estimate of a whitened channel based on the noise covariance matrix and the estimate of the fictitious channel.

2. The method of claim 1, wherein the step of generating a spatially and temporally stacked signal model includes generating a 2(M+1)-dimensional received (column) vector by stacking the in-phase (I) and quadrature-phase (Q) components of M+1 temporally adjacent received signal samples, where M is an integer which may be arbitrarily chosen to be greater than or equal to 0.

3. The method of claim 1, wherein the step of generating a spatially and temporally stacked signal model includes generating a $N_r(M+1)$-dimensional received (column) vector by stacking $N_r$ times oversampled samples of M+1 temporally adjacent received signal samples, where M is an integer arbitrarily chosen to be greater than or equal to 0.

4. The method of claim 1, wherein the step of generating a spatially and temporally stacked signal model includes generating a $N_r(M+1)$-dimensional received (column) vector by stacking M+1 temporally adjacent received signal samples obtained from $N_r$ antennas, where M is an integer arbitrarily chosen to be greater than or equal to 0.

5. The method of claim 1, wherein the step of generating a spatially and temporally stacked signal model includes generating a $N_r(M+1)$-dimensional received (column) vector, where M is an integer which may be arbitrarily chosen to be greater than or equal to 0, said generating step including a combination of:
    stacking in-phase (I) and quadrature-phase (Q) components of the received signal ($N_r=2$);
    oversampling the received signal by a factor of $N_r$; and
    utilizing signals from $N_r$ antennas.

6. A method in a radio receiver of joint synchronization and noise covariance estimation of a received signal, said method comprising the steps of:
    generating a spatially and temporally stacked signal model by stacking successive samples of temporally adjacent received signal vectors and corresponding training vectors;
    replacing a received Toeplitz channel matrix with a fictitious channel matrix that neglects the Toeplitz structure of the received channel matrix; and
    determining a maximum likelihood joint estimate of the fictitious channel, a noise covariance matrix, and a synchronization position, wherein the maximum likelihood joint estimate is found by maximizing a log likelihood function over all possible channel estimates of the fictitious channel, over all possible noise covariance matrices, and over all possible synchronization positions utilizing the spatially and temporally stacked signal model.

7. A system in a radio receiver for jointly synchronizing a received signal and estimating a noise covariance matrix, said system comprising:

a synchronization and estimation unit comprising:
- means for generating a spatially and temporally stacked signal model by stacking successive samples of temporally adjacent received signal vectors and corresponding training vectors;
- means for determining a best synchronization position for the received signal based on the stacked training vectors;
- means for computing whitening filter parameters for the received signal based on a noise covariance matrix;
- means for computing an estimate of a fictitious channel that neglects the Toeplitz structure of a received channel matrix; and
- means for computing an estimate of a whitened channel based on the noise covariance matrix and the estimate of the fictitious channel;

a data burst capture unit adapted to receive the synchronization position from the synchronization and estimation unit and to define the received data burst based on the synchronization position;

a whitening filter adapted to receive the defined data burst from the data burst capture unit, to receive the whitening filter parameters from the synchronization and estimation unit, and to generate a whitened data burst by filtering the defined data burst using the whitening filter parameters; and an equalizer adapted to receive the whitened data burst from the whitening filter, to receive the estimate of the whitened channel from the synchronization and estimation unit, and to equalize bits in the prefiltered data burst for further processing.

8. The system of claim 7, wherein the equalizer unit also includes:
- means for computing prefilter coefficients for the whitened data burst based on the whitened channel estimate from the synchronization and estimation unit;
- means for filtering the whitened data burst using the prefilter coefficients; and
- means for computing a prefiltered channel and passing the prefiltered channel to a sequence detector.

9. The system of claim 7, wherein the means for generating a spatially and temporally stacked signal model includes means for generating a 2(M+1)-dimensional received (column) vector by stacking the in-phase (I) and quadrature-phase (Q) components of M+1 temporally adjacent received signal samples, where M is an integer which may be arbitrarily chosen to be greater than or equal to 0.

10. The system of claim 7, wherein the means for generating a spatially and temporally stacked signal model includes means for generating a $N_r$(M+1)-dimensional received (column) vector by stacking $N_r$ times oversampled samples of M+1 temporally adjacent received signal samples, where M is an integer arbitrarily chosen to be greater than or equal to 0.

11. The system of claim 7, wherein the means for generating a spatially and temporally stacked signal model includes generating a $N_r$(M+1)-dimensional received (column) vector by stacking M+1 temporally adjacent received signal samples obtained from $N_r$ antennas, where M is an integer arbitrarily chosen to be greater than or equal to 0.

12. The system of claim 7, wherein the means for generating a spatially and temporally stacked signal model is adapted to generate a $N_r$(M+1)-dimensional received (column) vector, where M is an integer which may be arbitrarily chosen to be greater than or equal to 0, said means for generating the stacked signal model including:
- means for stacking in-phase (I) and quadrature-phase (Q) components of the received signal ($N_r$=2);
- means for oversampling the received signal by a factor of $N_r$; and
- means for utilizing signals from $N_r$ antennas.

* * * * *

UNITED STATES PATENT AND TRADEMARK OFFICE
CERTIFICATE OF CORRECTION

PATENT NO. : 8,000,420 B2  Page 1 of 3
APPLICATION NO. : 11/993507
DATED : August 16, 2011
INVENTOR(S) : Hui et al.

It is certified that error appears in the above-identified patent and that said Letters Patent is hereby corrected as shown below:

On the Title Page, in the Figure, delete "$H_I$" and insert -- $H_F$ --, therefor.

In Fig. 2, Sheet 1 of 3, delete "$H_I$" and insert -- $H_F$ --, therefor.

In Column 4, Line 51, in Equation (2), delete

" $r^{M+1}[n+n_0] = T(C)s^{L-M}[n] + v^{M+1}[n],$ " and insert -- $r^{M+1}[n+n_0] = T(C)s^{L-M}[n] + v^{M+1}[n],$ --, therefor.

Signed and Sealed this
Twenty-seventh Day of December, 2011

David J. Kappos
*Director of the United States Patent and Trademark Office*

United States Patent
Hui et al.

(10) Patent No.: US 8,000,420 B2
(45) Date of Patent: Aug. 16, 2011

(54) SYSTEM AND METHOD OF JOINT SYNCHRONIZATION AND NOISE COVARIANCE ESTIMATION

(75) Inventors: Dennis Hui, Cary, NC (US); Abdulrauf Hafeez, Cary, NC (US)

(73) Assignee: Telefonaktiebolaget L M Ericsson (PUBL), Stockholm (SE)

(*) Notice: Subject to any disclaimer, the term of this patent is extended or adjusted under 35 U.S.C. 154(b) by 906 days.

(21) Appl. No.: 11/993,507

(22) PCT Filed: Jun. 24, 2005

(86) PCT No.: PCT/IB2005/002149
§ 371 (c)(1),
(2), (4) Date: Dec. 21, 2007

(87) PCT Pub. No.: WO2006/136875
PCT Pub. Date: Dec. 28, 2006

(65) Prior Publication Data
US 2010/0136940 A1    Jun. 3, 2010

(51) Int. Cl.
*H03D 1/06* (2006.01)
*H04B 1/10* (2006.01)

(52) U.S. Cl. ....... 375/348; 375/350; 375/355; 455/63.1; 455/67.13; 455/296; 455/307

(58) Field of Classification Search ............. 375/267, 375/347, 348, 349, 350, 355, 356; 455/63.1, 455/67.13, 296, 307
See application file for complete search history.

(56) References Cited

U.S. PATENT DOCUMENTS

| | | | | |
|---|---|---|---|---|
| 6,064,689 A * | 5/2000 | Vollmer et al. | | 375/348 |
| 6,847,690 B1 * | 1/2005 | Sahlin et al. | | 375/354 |
| 6,961,371 B2 * | 11/2005 | Wang et al. | | 375/354 |
| 7,373,130 B2 * | 5/2008 | Huss | | 455/296 |
| 7,388,935 B2 * | 6/2008 | Hui | | 375/348 |
| 7,912,162 B2 * | 3/2011 | Mueller-Weinfurtner | | 375/354 |

OTHER PUBLICATIONS

David Astely, Andreas Jakobsson, A. Lee Swindlehurst "Burst Synchronization on Unknown Frequency Selective Channels with Co-Channel Interference Using an Antenna Array, Vehicular Technology Conference, May 16-20, 1999. Online vol. 3, May 16, 1999, pp. 2363-2367.

* cited by examiner

*Primary Examiner* — Quochien B Vuong
(74) *Attorney, Agent, or Firm* — Roger S Burleigh

(57) ABSTRACT

A system and method in a radio receiver for joint synchronization and noise covariance estimation of a received signal. A spatially and temporally stacked signal model, whereby successive samples of temporally adjacent received signal vectors and corresponding training vectors are stacked, is used in the derivation of the estimation problem. The Toeplitz structure of the channel response matrix is neglected in the formulation of the estimation problem. The resulting estimator jointly estimates a synchronization position, a channel response matrix, and a noise covariance matrix. An estimate of a whitened channel is then computed based on the noise covariance matrix and the estimate of the channel response matrix.

12 Claims, 3 Drawing Sheets